WILLIAM B. NICHOLS.
Improvement in Flour-Sifters.
No. 114,961.                          Patented May 16, 1871.
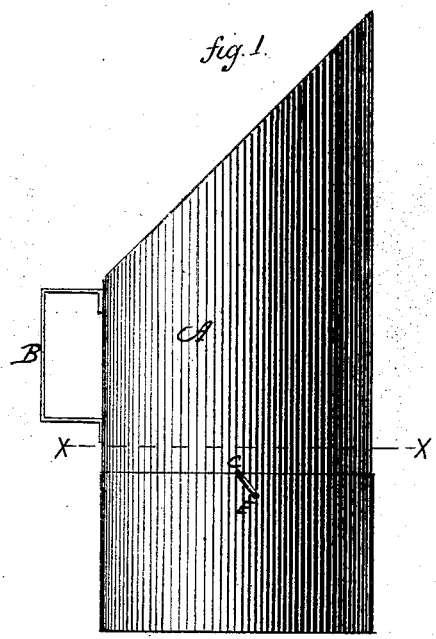
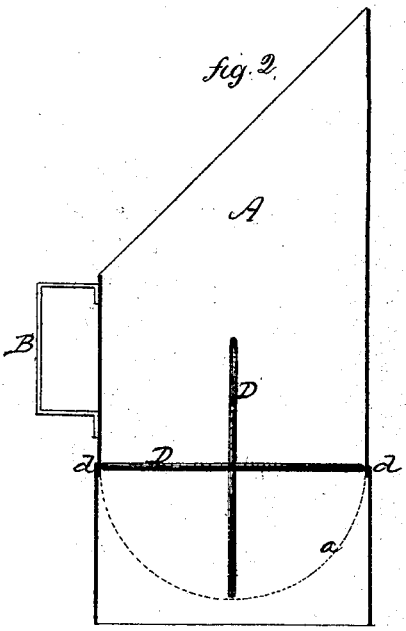
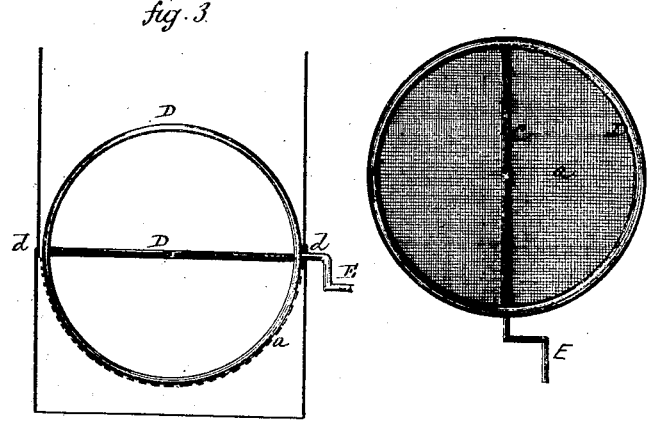

UNITED STATES PATENT OFFICE.

WILLIAM B. NICHOLS, OF SEYMOUR, ASSIGNOR TO HIMSELF AND T. B. CARPENTER, OF NEW HAVEN, CONNECTICUT.

IMPROVEMENT IN FLOUR-SIFTERS.

Specification forming part of Letters Patent No. 114,961, dated May 16, 1871.

*To all whom it may concern:*

Be it known that I, WILLIAM B. NICHOLS, of Seymour, in the county of New Haven and State of Connecticut, have invented a new Improvement in Flour-Sifter; and I do hereby declare the following, when taken in connection with the accompanying drawing and the letters of reference marked thereon, to be a full, clear, and exact description of the same, and which said drawing constitutes a part of this specification, and represents, in—

Figure 1, a side view; Fig. 2, a vertical central section; Fig. 3, a vertical central section cutting at right angles the section of Fig. 2; and in Fig. 4, a transverse central section on line $x\ x$.

This invention relates to an improvement in device for sifting flour and for like purposes; and it consists in the arrangement of a hemispherical sieve or screen, combined with a revolving beater, formed from wires running in close proximity to the concave side of the sieve, so that when flour is placed in the cylinder onto the concave side of the sieve, and the beater turned, the beater will pass between the wire, sieve, and flour, agitating the flour directly at the sieve sufficiently to cause it to pass through the sieve.

A is a cylinder, of any desirable form, by preference of scoop shape, and made from sheet metal. At a point distant from the bottom little more than half the diameter—say, at $d$—I arrange a sieve formed from a network of wire or other suitable material, and made in shape half of a sphere, or nearly so, the concave side up, as seen in Fig. 2, the upper edge of the sieve being secured entirely around the cylinder. Then, through the cylinder and on line with the axis of the sieve, I arrange a shaft, C, (see Figs. 3 and 4,) and on this shaft arrange one or more rings or circles of wire, D, the circumference of which corresponds very nearly to the diameter of the sieve.

I provide the shaft with a crank, E, so that by means of the said crank the rings D are made to sweep in close proximity to the inner surface of the sieve. The result of this is that when the flour is placed in the cylinder and the beaters or rings revolved they pass between the flour and sieve, agitating the flour sufficiently to cause it to pass through the sieve.

The spherical shape of the sieve and corresponding ring shape of the beaters or agitators enable me to make the agitators much lighter than could be done to operate in a cylindrical sieve.

I am aware that various devices for sifting flour have been used, embodying rotating beaters which rub the flour through the sieve; but such I do not claim.

I claim as my invention—

The arrangement of the hemispherical-shaped sieve $a$ within the cylinder A, combined with the revolving circular agitator D, (one or more,) substantially in the manner and for the purpose specified.

WILLIAM B. NICHOLS.

Witnesses:
THEODORE F. WARNER,
SHARON D. BEACH.